United States Patent [19]
McNeilly

[11] Patent Number: 5,255,095
[45] Date of Patent: Oct. 19, 1993

[54] DC RESTORE CIRCUIT IN A VIDEO INTERFACE FOR MEDICAL IMAGING SYSTEM

[75] Inventor: Peter J. McNeilly, Rochester, N.Y.

[73] Assignee: Eastman Kodak Company, Rochester, N.Y.

[21] Appl. No.: 797,840

[22] Filed: Nov. 26, 1991

[51] Int. Cl.⁵ ............................................... H04N 5/18
[52] U.S. Cl. .................................... 358/172; 358/171
[58] Field of Search ............... 358/171, 172, 168, 169, 358/166, 174

[56] References Cited

U.S. PATENT DOCUMENTS

| | | | |
|---|---|---|---|
| 4,237,489 | 12/1980 | Kresock | 358/172 |
| 4,513,321 | 4/1985 | Olson et al. | 358/172 |
| 4,549,214 | 10/1985 | Hinn | 358/172 |
| 4,811,087 | 3/1989 | Engel et al. | 358/172 |
| 4,827,191 | 5/1989 | Chapman | 341/132 |
| 4,873,702 | 10/1989 | Chiu | 375/76 |

*Primary Examiner*—James J. Groody
*Assistant Examiner*—David E. Harvey
*Attorney, Agent, or Firm*—William F. Noval

[57] ABSTRACT

A medical imaging system includes a video interface having a DC restore circuit for dynamically shifting an analog video signal so that its peak to peak amplitude is equal to the preselected range of an analog-to-digital converter.

2 Claims, 3 Drawing Sheets

DC RESTORE CIRCUIT IN A VIDEO INTERFACE FOR MEDICAL IMAGING SYSTEM

FIELD OF INVENTION

This invention relates in general to medical imaging systems and more particularly to an interface between a medical imaging modality and a radiographic printer.

BACKGROUND OF THE INVENTION

In traditional film/screen medical diagnostic imaging, an anatomical part of a patient is positioned between an x-ray source and an unexposed film/screen, an x-ray exposure of the anatomical part produces a latent x-ray image in the film and the film is developed. The developed x-ray film is then viewed on a light box by a diagnostician (radiologist/physician). More recently, medical diagnostic imaging modalities, such as CT and MRI scanners, have produced video x-ray images which are viewed on a video monitor. Frequently, a permanent x-ray image of a video x-ray image is made by photographing the video monitor to produce an x-ray film image. The x-ray film image can also be produced by a laser printer (such as the KODAK EKTASCAN LASER PRINTER sold by the Eastman Kodak Company, Rochester, N.Y.).

When using a laser printer to produce a permanent x-ray film image, problems arise from the different video formats used by different medical imaging modalities. Typically, the analog video signal produced by the modality is converted to a digital image signal which is used to drive the laser printer. In order to match the different analog signal values produced by different modalities to the predetermined signal range of the digitizing circuit, it is desirable to dynamically shift the level of the analog signal before digitization. The DC restoration circuits disclosed in the following patents are representative of known circuits which are not entirely suitable for such applications.

U.S. Pat. No. 4,827,191, issued May 2, 1989, inventor Chapman.

U.S. Pat. No. 4,873,702, issued Oct. 10, 1989, inventor Chin.

SUMMARY OF THE INVENTION

According to the present invention, there is provided a DC restoration circuit in a video interface for a medical imaging system. The DC restoration circuit samples an input video waveform during the back porch time frame of a horizontal line signal and dynamically shifts the sampled waveform so that the peak to peak amplitude of the active video signal is equal to the preselected input signal range of an analog-to-digital converter which digitizes the signal.

DESCRIPTION OF THE PREFERRED EMBODIMENTS

Figure 1:
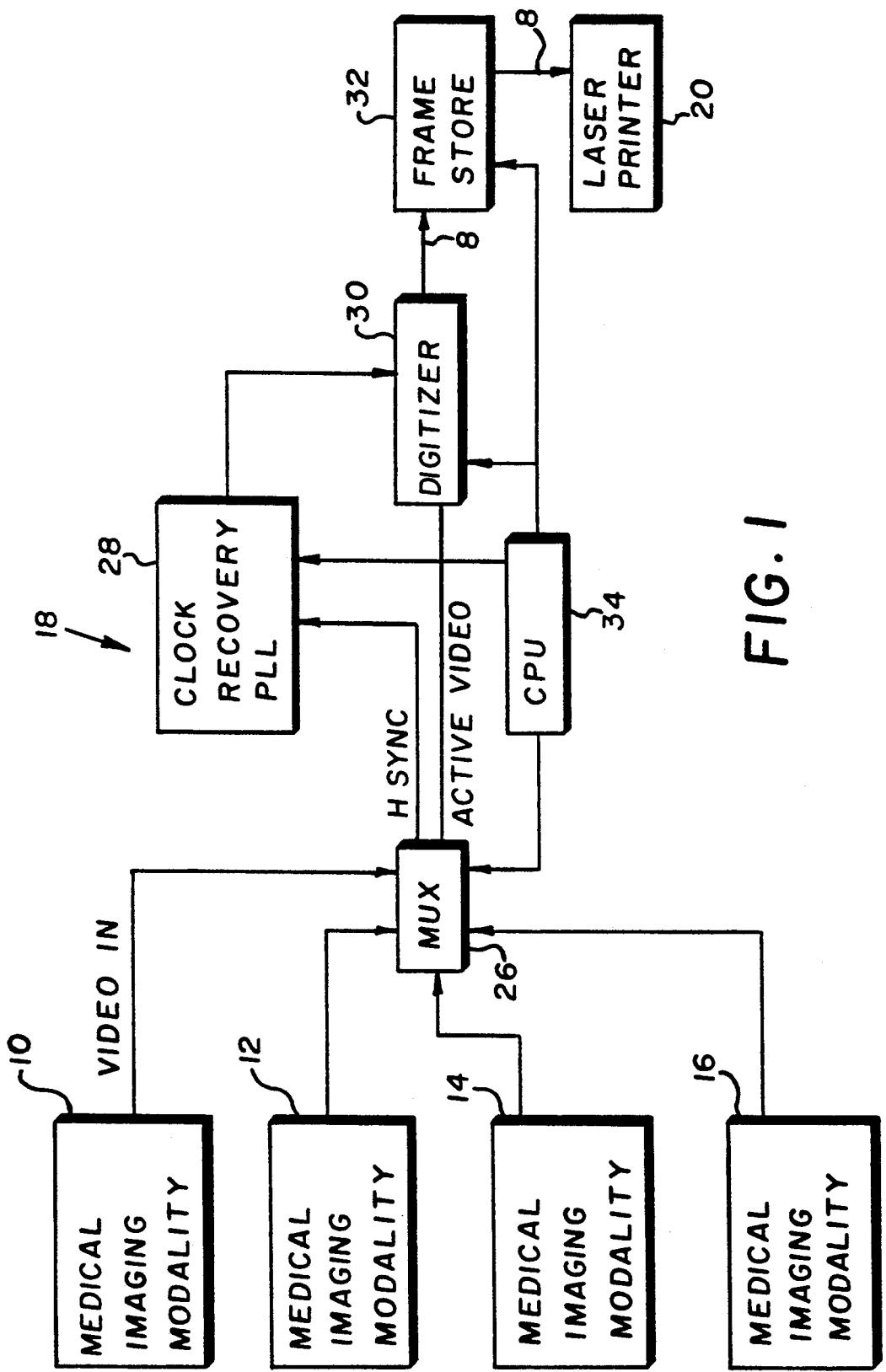
FIG. 1 is a block diagram of a medical imaging system including an embodiment of the present invention.

Referring now to the Figures, there will be described an embodiment of the present invention as used in a medical imaging system. It will be understood that the present invention can also be used in other imaging systems in which an analog video signal is converted to a digital image signal. The medical imaging system in FIG. 1 includes medical imaging modalities 10, 12, 14, 16 (such as CT, MRI, US, PET), video interface 18 and laser printer 20. Modalities 10, 12, 14, 16 produce x-ray analog video images which are applied to inputs 21, 22, 23, 24 of video multiplexer (MUX) 26 of video interface 18. Video interface 18 includes phase-lock-loop (PLL) 28, digitizer 30, frame store 32 and control processor unit (CPU) 34. CPU 34 enables MUX 26 to pass a video signal from only one of modalities 10, 12, 14, 16 to digitizer 30 where the active video is converted from an analog image to a digital image. The horizontal sync is applied to PLL 28 which produces the pixel clock for digitizer 30. The digital image is stored in frame store 32 before it is applied to laser printer 20 to produce a hardcopy x-ray film image. Other types of printers, such as thermal printers or cathode ray tube printers, can also be used to produce a hard copy x-ray image.

Figure 2:
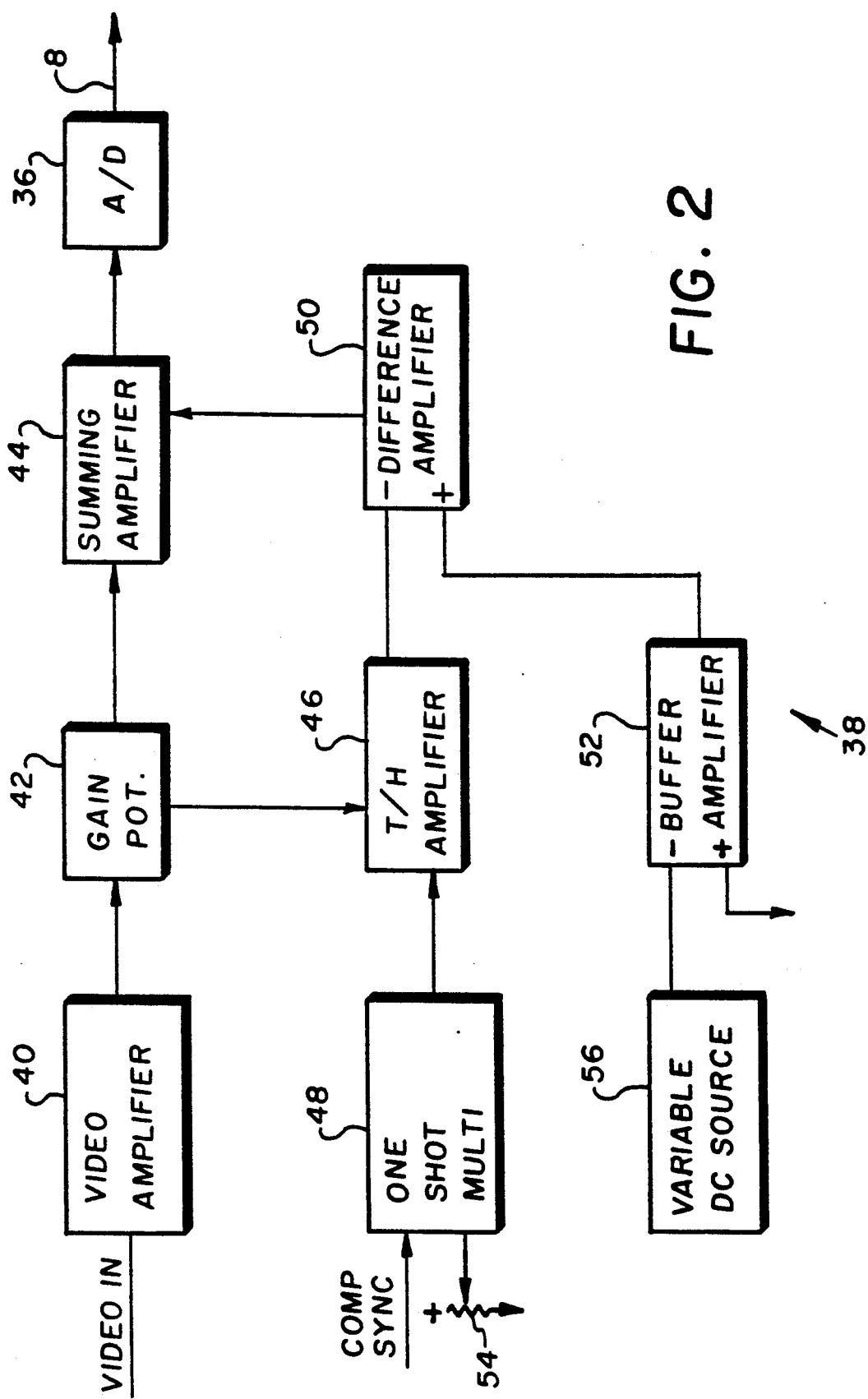
FIG. 2 is a schematic diagram of the embodiment of FIG. 1.
Figure 3:
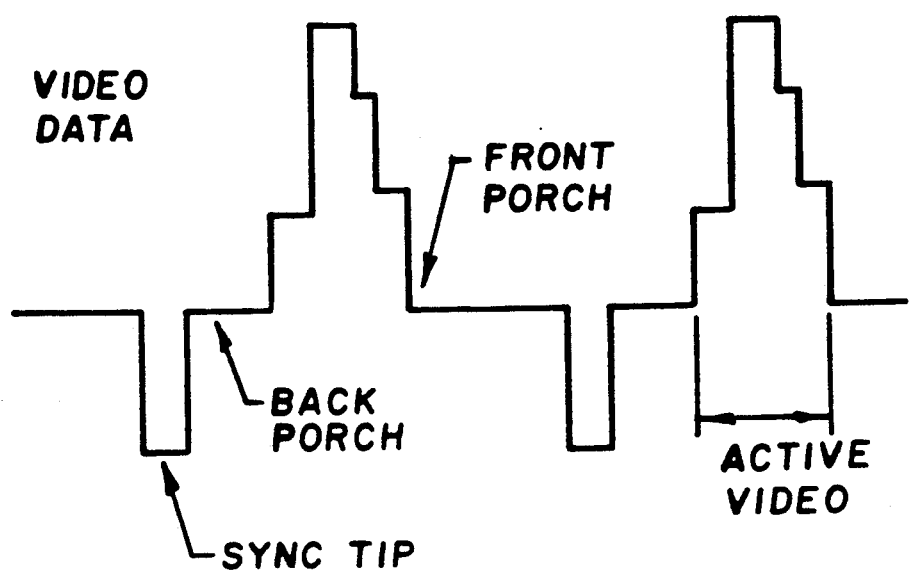
FIGS. 3 and 4 are waveform diagrams useful in describing operation of the present invention.
Figure 4:
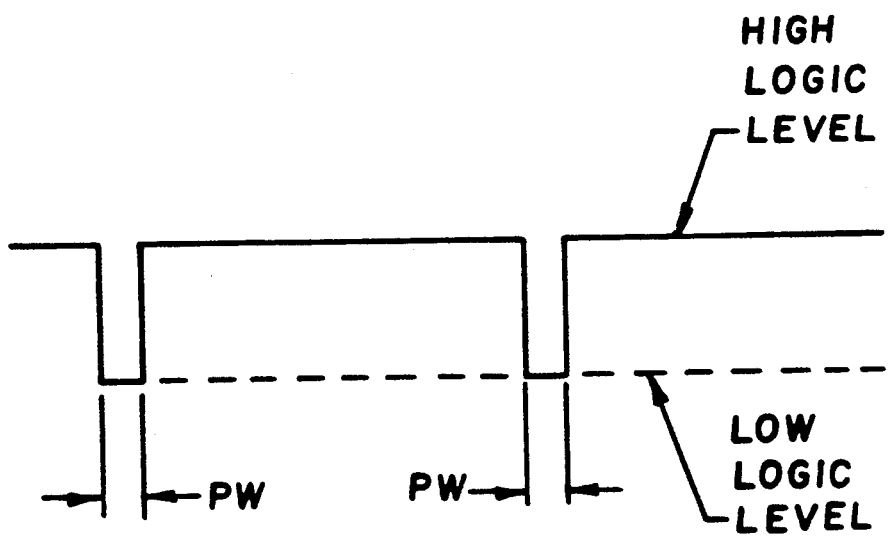

Referring now to FIGS. 2-4, there will be described an embodiment of the present invention. As shown, digitizer 30 includes an analog-to-digital converter A/D 36 and DC restore circuit 38. Circuit 38 includes wideband video amplifier 40, gain potentiometer 42, summing amplifier 44, track and hold amplifier 46, one shot multivibrator 48, difference amplifier 50, buffer amplifier 52, timing potentiometer 54, variable DC source potentiometer 56.

Operation of the circuit of FIG. 2 is as follows. A composite analog video signal (see FIG. 3) is amplified by amplifier 40 and applied to one input of summing amplifier 44. The voltage gain of the amplified video signal can be adjusted by adjustment of potentiometer 42. The input signal range of analog-to-digital converter 36 is preselected, e.g., 0 to −2 volts. Because the input analog video signal level can vary depending upon the modality source, the signal level of the analog signal must be dynamically shifted to fit the preselected signal range of A/D 36. Track and hold amplifier 46 is used to sample the input video signal during the back porch time interval (see FIG. 3). The timing (FIG. 4) for this sampling is determined by one shot multivibrator 48, which is adjusted by potentiometer 54. The output of amplifier 46 is applied to the inverting input of difference amplifier 50.

Potentiometer 56 is adjusted until a code value (digital value) of 1 (black level) is obtained at the output of A/D 36. This voltage is applied to the non-inverting input of difference amplifier 50 by way of buffer amplifier 52. The output of amplifier 50 is applied to amplifier 44. The analog video signal output from amplifier 44 is level shifted so that its range is matched to the preselected input range of A/D 36.

Although the invention has been described with reference to preferred embodiments thereof, it will be understood that variations and modification can be effected within the spirit and scope of the invention as described above as defined in the appended claims.

What is claimed is:

1. A DC restore interface apparatus for a medical imaging system comprising:

input means for receiving an analog video signal from a medical imaging source, said analog video signal having an active video portion and a composite sync portion with a back porch interval;

a summing amplifier having first and second inputs;

means for coupling said analog video signal from said input means to said first input of said summing amplifer;

a difference amplifier having inverting and non-inverting inputs connected to said second input of said summing amplifier;

a track and hold amplifier, coupled to the inverting input of said difference amplifier, for sampling the signal level of said analog video signal during said back porch interval, said sampling being accomplished before said analog signal is input to said summing amplifier;

a one shot multivibrator connected to said track and hold amplifier for determining the timing and duration of said sampling by said track and hold amplifier;

a buffer amplifier connected to said noninverting input of said difference amplifier, and having inverting and non-inverting inputs, said non-inverting input being connected to ground;

a variable direct current (DC) source connected to the inverting input of said buffer amplifier; and an analog-to-digital converter connected to the output of said summing amplifier; wherein said output of said difference amplifier is a negative DC voltage which is summed with said analog video signal in said summing amplifier so that the output video signal from said summing amplifier is dynamically shifted to the reselected range of said analog-to-digital converter.

2. The apparatus of claim 1 including means for adjusting the timing of sampling of said one shot multivibrator.

* * * * *